Figure 1:
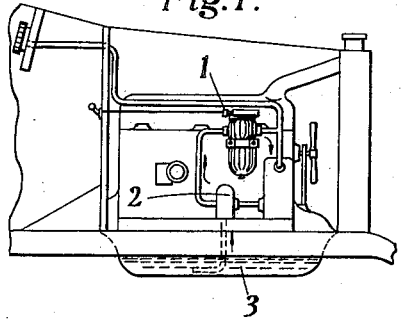

March 8, 1932.     J. A. PICKARD ET AL     1,849,042
FILTER OR STRAINER
Filed April 14, 1931     2 Sheets-Sheet 1

INVENTORS
J.A. Pickard,
F. Rogers and
W. Mitchell
by  E. F. Wendroth
ATTORNEY

March 8, 1932.   J. A. PICKARD ET AL   1,849,042
FILTER OR STRAINER
Filed April 14, 1931   2 Sheets-Sheet 2

INVENTORS
J. A. Pickard,
F. Rogers and
W. Mitchell
by
ATTORNEY

Patented Mar. 8, 1932

1,849,042

UNITED STATES PATENT OFFICE

JOSEPH ALLEN PICKARD, OF ACTON, LONDON, AND FRANK ROGERS AND WALTER MITCHELL, OF LONDON, ENGLAND, ASSIGNORS TO METAFILTERS (1929) LIMITED, OF HOUNSLOW, ENGLAND, A BRITISH COMPANY

FILTER OR STRAINER

Application filed April 14, 1931, Serial No. 530,038, and in Great Britain April 11, 1930.

This invention relates to filters or strainers particularly such as are used for the filtration or straining of oil.

The present invention has for one of its objects the provision of a filter particularly for the oil of forced lubricating circuits, comprising in combination a cylindrical body portion, a cover, means for attachment of the cover to the body portion, a lateral extension on the filter at an upper portion thereof having a borehole therethrough, an oil inlet and an oil outlet connecting respectively to the ends of said borehole, a spring-controlled valve normally obstructing a direct flow through said borehole and a duct connecting the inlet side of said borehole with the interior of said body portion, a rod extending from said cover on its underside, an assembly of spaced filter plates mounted co-axially upon said rod which serves also as a central drainage conduit to said plates, a transverse cylinder on the upper side of said cover in communication near one end with the said conduit and near its other end with the outlet side of the aforesaid borehole, a plunger in said cylinder and means for moving said plunger at will along the cylinder in the reverse direction to the normal flow of circulating fluid.

A further object of this invention is the provision of a filter particularly for the oil of forced lubricating circuits comprising in combination a cylindrical body portion, a cover, means for attachment of the cover to the body portion, a lateral extension on the filter at an upper portion thereof having a borehole therethrough, an oil inlet and an oil outlet connecting respectively to the ends of said borehole, a spring-controlled valve normally obstructing a direct flow through said borehole and a duct connecting the inlet side of said borehole with the interior of said body portion, a rod extending from said cover on its underside, an assembly of spaced filter plates mounted coaxially upon said rod which serves also as a central drainage conduit to said plates, a device located within the filter for scraping the edge surface of the filter plates at will, means operable from the exterior of the filter for actuating said device, a sludge drainage passage at the base of the body portion, cooling fins formed on the outer surface of said body portion longitudinally thereof, a transverse cylinder on the upper side of said cover in communication near one end with the said conduit and near its other end with the outlet side of the aforesaid borehole, a plunger in said cylinder and means for moving said plunger at will along the cylinder in the reverse direction to the normal flow of circulating fluid.

The foregoing and other features of the present invention will now be described more fully with reference to the accompanying drawings in which:—

Figure 2:
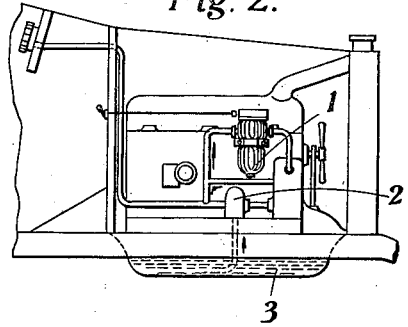
Figure 3:
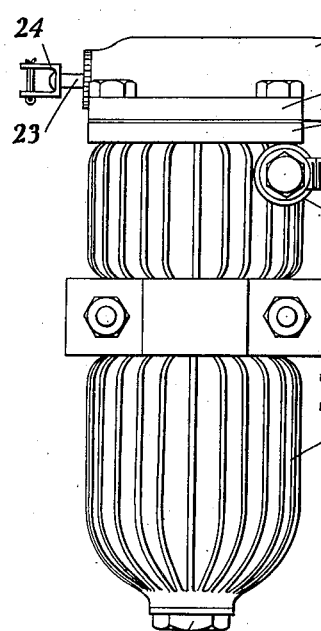
Figure 10:
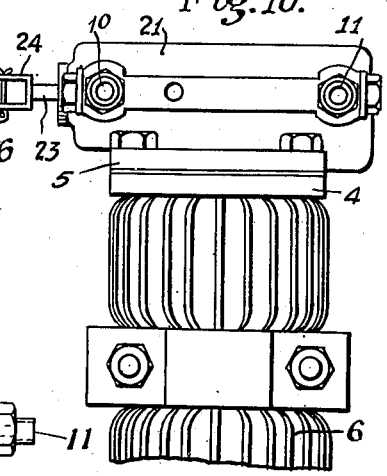
Figure 4:
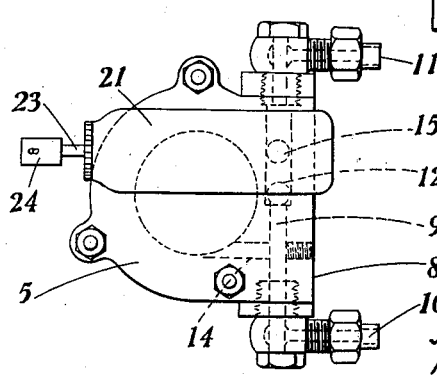
Figure 5:
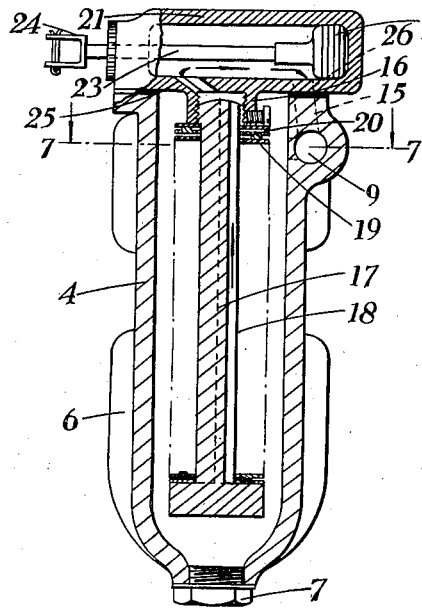
Figure 8:
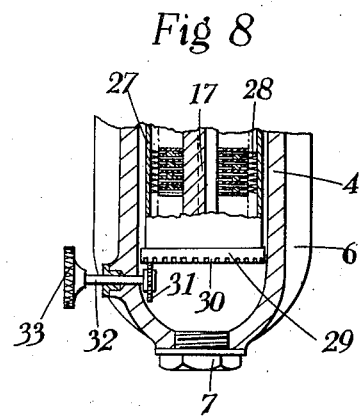
Figure 6:
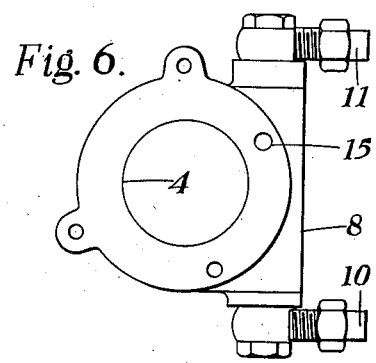
Figure 9:
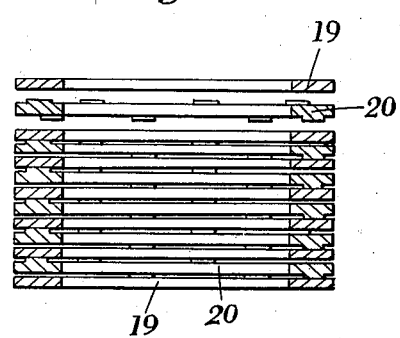
Figure 7:
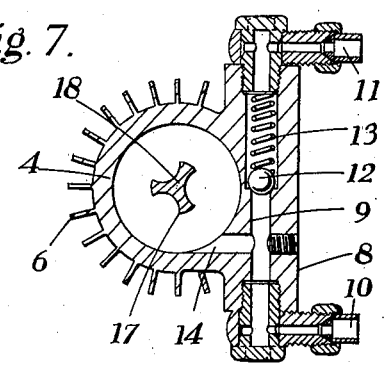

Figure 1 is a diagrammatic view of an automobile engine equipped with one embodiment of the improved filter connected in series in its lubricating system, Figure 2 is a second diagrammatic view showing the filter connected in a by-pass or shunt circuit with respect to the main lubricating circuit, Figure 3 is an enlarged elevation of the filter and Figure 4 is a corresponding plan view, Figure 5 is a sectional elevation showing the cover unitary with the filtering unit, Figure 6 is a plan view of the container body, the cover having been removed, Figure 7 is a sectional plan on the line 7—7 of Figure 5, Figure 8 is a fragmentary view showing a scraper co-operating with the filtering unit, Figure 9 is a detail view of some of the filter discs, and Figure 10 is an enlarged elevation of the upper part of the filter shown in Figure 3.

Referring first to Figures 1 and 2, it is seen that the filter designated generally by the reference numeral 1 is interposed in the oil circulation system on the pressure side of the oil pump 2 which draws up the oil from the engine sump 3. In Figure 1 the filter is shown in the main oil circuit so that the whole of the oil delivered by the pump is cleaned. In Figure 2 the filter is shown in a by-pass circuit.

The filter itself as shown in detail in Figures 3 to 7 is a closed container comprising a body portion 4 and a head or cover 5.

The body portion 4 is formed externally with fins 6, the function of which is to bring the filter and its contents to the optimum temperature for filtration and engine operation and to dissipate any excess heat existing in the oil above this temperature. The optimum temperature under normal circumstances will be that of the air circulated by the fan through the radiator and over the engine. The filter body 4 is also provided with a drainage plug 7 by removing which the sediment or sludge can be withdrawn from time to time. Near the top of the body portion is a lateral extension 8 having a longitudinal bore hole or passage 9 to the ends of which are attached an inlet pipe or connection 10 and an outlet pipe or connection 11. Travel through the bore hole 9 is normally obstructed by a ball 12 controlled by a spring 13. Between the inlet 10 and the ball 12 is a duct 14 extending laterally from the bore hole 9 through the wall of the body 4 to the interior of the latter. A second duct 15 extends vertically upwards from the bore hole 9 between the ball 12 and the outlet 11.

The head or cover 5 is formed on its underside with a cup or socket 16 into which is screwed one end of a supporting rod 17 which may be hollow and perforated to serve also as a conduit or may alternatively, as shown, be longitudinally fluted as at 18 to serve both as support and as internal drainage member or conduit for the co-axial assembly of spaced filter discs or rings, these being alternatively plain as at 19 and embossed as at 20 (Figure 9) to a predetermined extent so that their surfaces are spaced apart to the requisite degree to effect satisfactory filtering of the dirty oil. On the upper surface of the cover is a transversely extending cylinder 21 containing a plunger 22 and rod 23, the latter extending through one end of the cylinder and being forked as at 24 for ready attachment to any actuating rod or linkage or the like.

Although not shown, the cover may if desired be provided with fins or their equivalent to serve the same purpose as the fins on the body portion.

A passage or duct 25 provides communication between the cup or socket 16 and the interior of the cylinder 21 at one end, whilst a duct or passage 26 provides communication between the other end of the interior of the cylinder and the vertical duct 15 in the lateral extension 8 of the body portion.

In a modified construction of the filter as shown in Figure 10 the bore hole 9 is formed in the head or cover 5 alongside the cylinder 21 instead of in a lateral extension of the body portion.

The operation of the filter as shown will now be described. The oil under pressure from the pump 2 passes through the filter inlet 10 and along the bore hole 9 and thence laterally through the duct 14 into the interior of the filter at or near its top. By admitting the oil at or near the top the flow of the oil is downwards in the body of the filter at all points. Consequently any separated solid matter detached from the surface of the filter by the cleaning action is carried down towards the dead space at the bottom. The solid particles are arrested at the edges of the filter discs 19 and 20 and the filtered oil passes between the discs and along the flutings 18 to the cup or socket 16. The oil then passes from the interior of the cup or socket 16 through the duct or passage 25 into the cylinder 21 and thence out through the ducts or passages 26 and 15, the bore hole 9 and the outlet 11.

It is to be observed that the plunger 22 in the cylinder 21 normally occupies an inoperative non-obstructive position at one end of the cylinder. If, however, it is desired at any time to flush the filtering unit and drive off from the discs the solid accumulated thereon the plunger rod 23 is pulled so that the plunger passes over the duct 26 and then drives the oil in the cylinder 21 back through the passage 25, into the cup 16, down the flutings 18, and through the spaces between the discs. When the pull on the plunger rod is relaxed the normal pressure of the oil drives the plunger back to its normal position. This return movement may be assisted by a spring (not shown) which may be inside the cylinder, or outside of the latter, between the end of the cylinder and a head on the plunger rod, the latter being actuated by foot or hand.

If at any time the filter should become greatly clogged or wholly inoperative owing to neglect or otherwise, the increased oil pressure will drive back the ball 12 against the resistance of its control spring 13 and the oil will thus pass straight from the inlet 10 through the bore 9 past the ball 12 to the outlet 11, thus maintaining the oil circulation.

It will be understood that the filtering unit, consisting of the filter discs 19 and 20 and supporting rod 17, is readily accessible by being attached to and removable with the cover 5. As however it may be desirable to scrape the filtering unit while in position within the body portion 4, provision may be made to effect a scraping action. Means for this purpose are shown in Figure 8 where a skeleton cylinder 27 is shown fitting loosely within the filter body 4 and having strips or tongues 28 extending inwards to make loose engagement with the surface of the filtering unit. The skeleton cylinder 27 has a base ring 29 having holes 30 therein for engagement with projections or teeth on a rotary disc 31 secured to the end of a spindle 32 extending through the wall of the filter body 4 and terminating externally with a knurled head 33 so that by turning the head 33, the cylinder is caused to rotate and the strips or tongues 28 are caused to scrape the surface of the filtering unit. Obviously the spindle 32 may be actuated by any suitable means other than by the knurled head 33, as for example by a pawl and ratchet or by a crank actuated either by hand or foot. Operation of this scraping device will also assist the removal of sludge when the sludge drainage plug is removed.

What we claim is:—

1. A filter particularly for the oil of forced lubricating circuits, comprising in combination a cylindrical body portion, a cover, means for attachment of the cover to the body portion, a lateral extension on the filter at an upper portion thereof having a borehole therethrough, an oil inlet and an oil outlet connecting respectively to the ends of said borehole, a spring-controlled valve normally obstructing a direct flow through said borehole and a duct connecting the inlet side of said borehole with the interior of said body portion, a rod extending from said cover on its underside, an assembly of spaced filter plates mounted co-axially upon said rod which serves also as a central drainage conduit to said plates, a transverse cylinder on the upper side of said cover in communication near one end with the said conduit and near its other end with the outlet side of the aforesaid borehole, a plunger in said cylinder and means for moving said plunger at will along the cylinder in the reverse direction to the normal flow of circulating fluid.

2. A filter particularly for the oil of forced lubricating circuits, comprising in combination a cylindrical body portion, a cover, means for attachment of the cover to the body portion, a lateral extension on the said body portion at an upper portion thereof having a bore hole therethrough, an oil inlet and an oil outlet connecting respectively to the ends of said borehole, a spring-controlled valve normally obstructing a direct flow through said borehole and a duct connecting the inlet side of said borehole with the interior of said body portion, a rod extending from said cover on its underside, an assembly of spaced filter plates mounted co-axially upon said rod which serves also as a central drainage conduit to said plates a transverse cylinder on the upper side of said cover in communication near one end with the said conduit and near its other end with the outlet side of the aforesaid borehole, a plunger in said cylinder and means for moving said plunger at will along the cylinder in the reverse direction to the normal flow of circulating fluid.

3. A filter particularly for the oil of forced lubricating circuits, comprising in combination a cylindrical body portion, a cover, means for attachment of the cover to the body portion, a lateral extension on the said cover having a borehole therethrough, an oil inlet and an oil outlet connecting respectively to the ends of said borehole, a spring-controlled valve normally obstructing a direct flow through said borehole and a duct connecting the inlet side of said borehole with the interior of said body portion, a rod extending from said cover on its underside, an assembly of spaced filter plates mounted co-axially upon said rod which serves also as a central drainage conduit to said plates a transverse cylinder on the upper side of said cover in communication near one end with the said conduit and near its other end with the outlet side of the aforesaid borehole, a plunger in said cylinder and means for moving said plunger at will along the cylinder in the reverse direction to the normal flow of circulating fluid.

4. A filter particularly for the oil of forced lubricating circuits, comprising in combination a cylindrical body portion, a cover, means for attachment of the cover to the body portion, a lateral extension on the filter at an upper portion thereof having a borehole therethrough, an oil inlet and an oil outlet connecting respectively to the ends of said borehole, a spring-controlled valve normally obstructing a direct flow through said borehole and a duct connecting the inlet side of said borehole with the interior of said body portion, a rod extending from said cover on its underside, an assembly of spaced filter plates mounted coaxially upon said rod which serves also as a central drainage conduit to said plates, a device located within the body portion and comprising a skeleton cylinder coaxially rotatable around the plates and having inwardly projecting scraper strips or tongues, a sludge drainage passage at the base of the body portion, cooling fins formed on the outer surface of said body portion longitudinally thereof, a transverse cylinder on the upper side of said cover in communication near one end with the said conduit and near its other end with the outlet side of the aforesaid borehole, a plunger in said cylinder and means for moving said plunger at will along the cylinder in the reverse direction to the normal flow of circulating fluid.

5. A filter particularly for the oil of forced lubricating circuits, comprising in combination a cylindrical body portion, a cover, means for attachment of the cover to the body portion, a lateral extension on the filter at an upper portion thereof having a borehole therethrough, an oil inlet and an oil outlet connecting respectively to the ends of said borehole, a spring-controlled valve normally obstructing a direct flow through said borehole and a duct connecting the inlet side of said borehole with the interior of said body portion, a rod extending from said cover on its underside, an assembly of spaced filter plates mounted coaxially upon said rod which serves also as a central drainage conduit to said plates, a device located within the filter for scraping the edge surface of the filter plates at will, means operable from the exterior of the filter for actuating said device, a sludge drainage passage at the base of the body portion, cooling fins formed on the outer surface of said body portion longitudinally thereof, a transverse cylinder on the upper side of said cover in communication near one end with the said conduit and near its other end with the outlet side of the aforesaid borehole, a plunger in said cylinder and means for moving said plunger at will along the cylinder in the reverse direction to the normal flow of circulating fluid.

In testimony whereof we have signed our names to this specification.

JOSEPH ALLEN PICKARD.
FRANK ROGERS.
WALTER MITCHELL.